US008270618B2

(12) United States Patent
Herre et al.

(10) Patent No.: US 8,270,618 B2
(45) **Date of Patent: *Sep. 18, 2012**

(54) COMPATIBLE MULTI-CHANNEL CODING/DECODING

(75) Inventors: Juergen Herre, Buckenhof (DE); Johannes Hilpert, Nuremberg (DE); Stefan Geyersberger, Wuerzburg (DE); Andreas Hölzer, Erlangen (DE); Claus Spenger, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 983 days.

This patent is subject to a terminal disclaimer.

(21) Appl. No.: 12/206,778

(22) Filed: Sep. 9, 2008

(65) Prior Publication Data

US 2009/0003612 A1 Jan. 1, 2009

Related U.S. Application Data

(63) Continuation of application No. 10/679,085, filed on Oct. 2, 2003, now Pat. No. 7,447,317.

(51) Int. Cl.

| | |
|---|---|
| ***G10L 19/00*** | (2006.01) |
| ***G10L 11/00*** | (2006.01) |
| ***G10L 19/02*** | (2006.01) |
| ***H04R 5/00*** | (2006.01) |
| ***H04R 29/00*** | (2006.01) |
| ***H04R 5/02*** | (2006.01) |
| ***H04R 25/00*** | (2006.01) |
| ***G06F 19/00*** | (2006.01) |

(52) U.S. Cl. .......... 381/23; 704/500; 704/501; 704/200; 704/200.1; 704/203; 381/17; 381/19; 381/27; 381/56; 381/57; 381/300; 381/307; 381/317; 700/94

(58) Field of Classification Search .................. 704/500, 704/200, 200.1, 501; 381/300, 317, 56, 57, 381/307, 27, 23, 17, 19; 700/94
See application file for complete search history.

(56) References Cited

U.S. PATENT DOCUMENTS 5,040,217 A * 8/1991 Brandenburg et al. .... 704/200.1

(Continued)

FOREIGN PATENT DOCUMENTS

EP 0688113 A2 12/1995

OTHER PUBLICATIONS

Pan, D. "A tutorial on MPEG/audio compression." IEEE Multimedia, vol. 2, Iss.2, Summer 1995, pp. 60-74.*

(Continued)

*Primary Examiner* — Paras D Shah
(74) *Attorney, Agent, or Firm* — Laurence A. Greenberg; Werner H. Stemer; Ralph E. Locher

(57) ABSTRACT

In processing a multi-channel audio signal having at least three original channels, a first downmix channel and a second downmix channel are provided, which are derived from the original channels. For a selected original channel of the original channels, channel side information are calculated such that a downmix channel or a combined downmix channel including the first and the second downmix channels, when weighted using the channel side information, results in an approximation of the selected original channel. The channel side information and the first and second downmix channels form output data to be transmitted to a decoder, which, in case of a low level decoder only decodes the first and second downmix channels or, in case of a high level decoder provides a full multi-channel audio signal based on the downmix channels and the channel side information. Since the channel side information only occupy a low number of bits, and since the decoder does not use dematrixing, an efficient and high quality multi-channel extension for stereo players and enhanced multi-channel players is obtained.

22 Claims, 7 Drawing Sheets

(Encoder)

U.S. PATENT DOCUMENTS

| | | | | |
|---|---|---|---|---|
| 5,701,346 | A | 12/1997 | Herre et al. | |
| 5,859,826 | A | 1/1999 | Ueno et al. | |
| 6,205,430 | B1 * | 3/2001 | Hui | 704/500 |
| 6,442,517 | B1 * | 8/2002 | Miller et al. | 704/201 |
| 6,763,115 | B1 | 7/2004 | Kobayashi | |
| 2003/0026441 | A1 | 2/2003 | Faller | |
| 2003/0035553 | A1 | 2/2003 | Baumgarte et al. | |
| 2003/0219130 | A1 | 11/2003 | Baumgarte et al. | |
| 2004/0181393 | A1 * | 9/2004 | Baumgarte | 704/200.1 |

OTHER PUBLICATIONS

Stoll, G. "MPEG audio layer II. A generic coding standard for two and multichannel sound for DVB, DAB and computer multimedia." Broadcasting Convention, 1995. IBC 95., International, Vol., Iss., Sep. 14-18, 1995, pp. 136-144.*
Paraskevas, M.; Mourjopoulos, J. "A differential perceptual audio coding method with reduced bitrate requirements." Speech and Audio Processing, IEEE Transactions on, vol. 3, Iss.6, Nov. 1995, pp. 490-503.*
International Search Report and Written Opinion dated May 2, 2005.
Jürgen Herre et al: "Intensity Stereo Coding", AES 96th Convention, Feb. 26-Mar. 1, 1994, Amsterdam, Netherlands, AES preprint 3799, pp. 1-10.
Christof Faller et al: "Binaural Cue Coding Applied to Stereo and Multi-Channel Audio Compression", Audio Engineering Society, Convention Paper 5574, 112th Convention, May 10-13, 2002, Munich, Germany, pp. 1-9.
Christof Faller et al: "Binaural Cue Coding—Part II: Schemes and Applications", IEEE Transactions on Speech and Audio Processing, vol. 11, No. 6, Nov. 2003, pp. 520-531.
Günther Theile et al: "MUSICAM—Surround: A Universal Multi-Channel Coding System Compatible with ISO 11172-3", Audio Engineering Society, Convention Paper 3403, 93rd Convention, Oct. 1-4, 1992, San Francisco, pp. 1-9.
B. Grill et al: "Improved MPEG-2 Audio Multi-Channel Encoding", Audio Engineering Society, Convention Paper 3865, 96th Convention, Feb. 26-Mar. 1, 1994, Amsterdam, Netherlands, pp. 1-9.
Frank Baumgarte et al: "Binaural Cue Coding—Part I: Psychoacoustic Fundamentals and Design Principles", IEEE Transactions on Speech and Audio processing, vol. 11, No. 6, Nov. 2003, pp. 509-519.
Recommendation ITU-R BS 775-1: "Multichannel stereophonic sound system with and without accompanying picture", 11pgs, 2002.
Jürgen Herre et al: "MP3 Surround: Efficient and Compatible Coding of Multi-Channel Audio", Audio Engineering Society, Convention Paper 6049, 116th Convention, May 8-11, 2004, Berlin, Germany, pp. 1-14.
Joseph Hull: "Surround Sound Past, Present, and Future", Dolby Laboratories, 1999, pp. 1-7.
Roger Dressler: "Dolby Surround Pro Logic II Decoder Principles of Operation", Dolby Laboratories, Inc., 2000, pp. 1-7.
Jürgen Herre et al: "Combined Stereo Coding", Audio Engineering Society, Convention Paper 3369, 93RD Convention, Oct. 1-4, 1992, San Francisco, pp. 1-17.
Dolby Laboratories, Inc. User's Manual: "Dolby DP563 Dolby Surround and Pro Logic II Encoder", Issue 3, 2003.
Minnetonka Audio Owner's Manual: "SurCode for Dolby Pro Logic II", pp. 1-23, 2003.
Erik Schuijers et al: "Low complexity parametric stereo coding", Audio Engineering Society, Convention Paper 6073, 116th Convention, May 8-11, 2004, Berlin, Germany, pp. 1-11.
Christof Faller: "Coding of Spatial Audio Compatible with Different Playback Formats", Audio Engineering Society, Convention Paper, 117th Convention, Oct. 28-31, 2004, San Francisco, CA, pp. 1-12.

* cited by examiner

FIG 1 (Encoder)
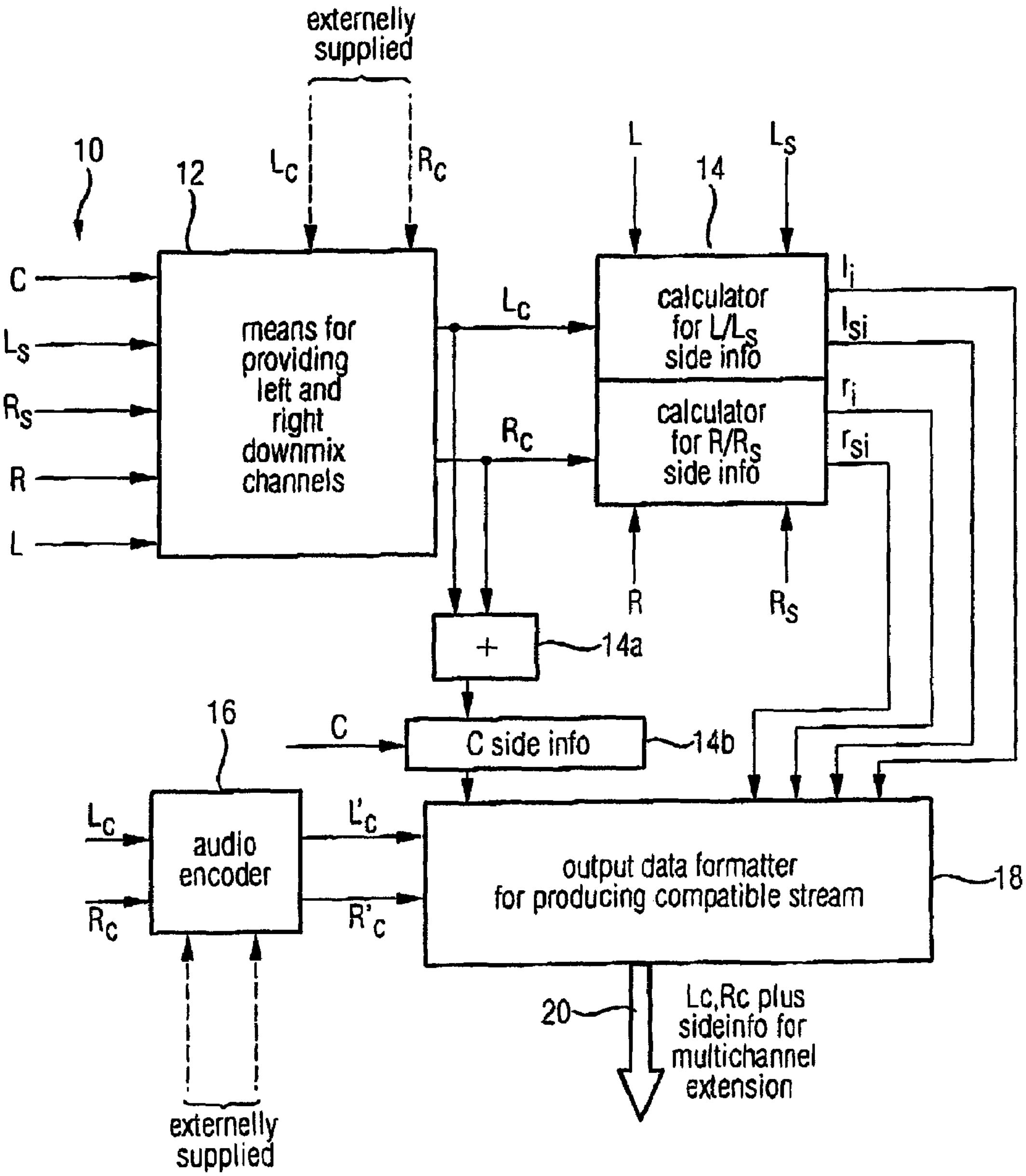

FIG 2 (Decoder)
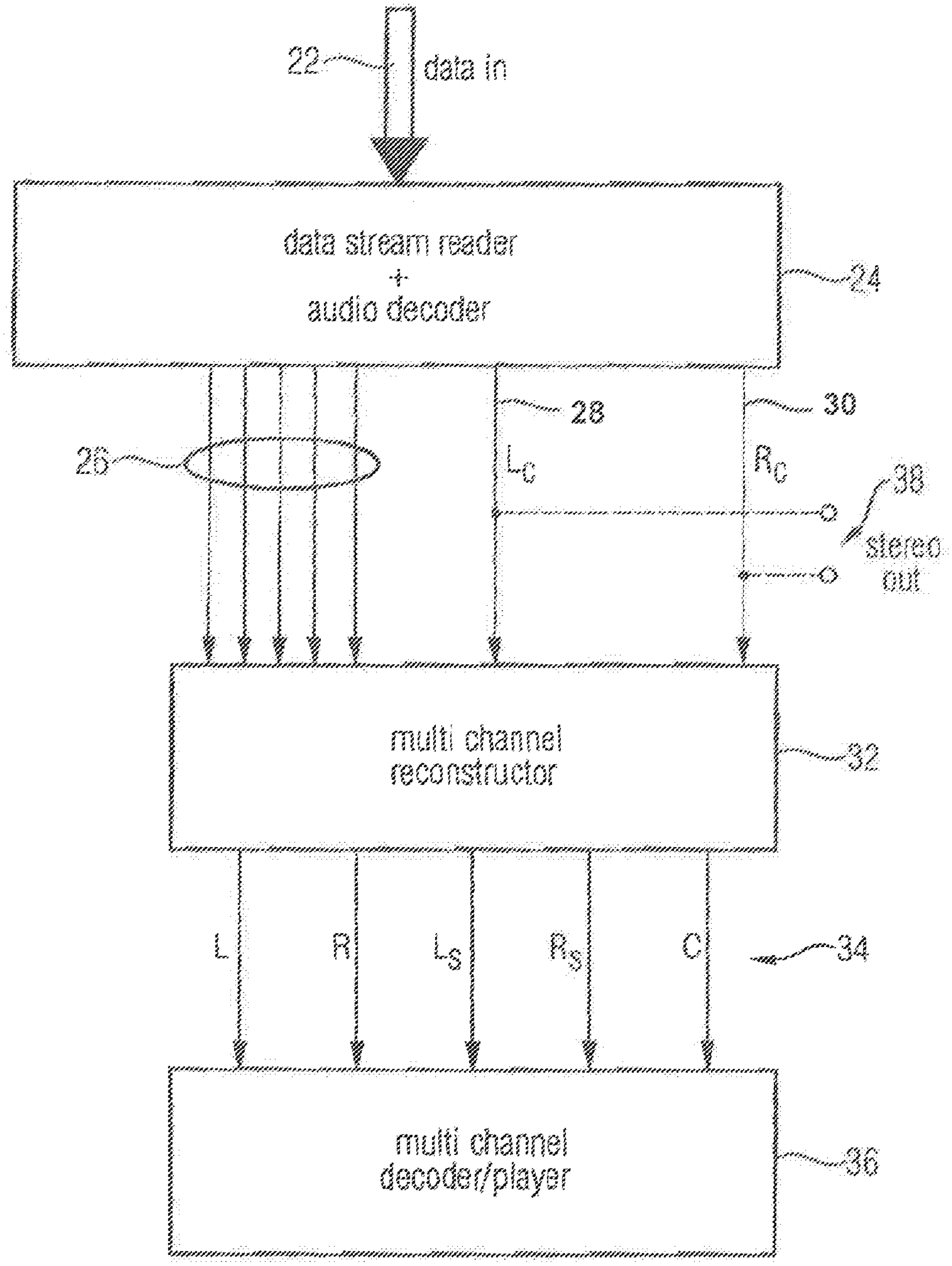

FIG 4 (encoder side)
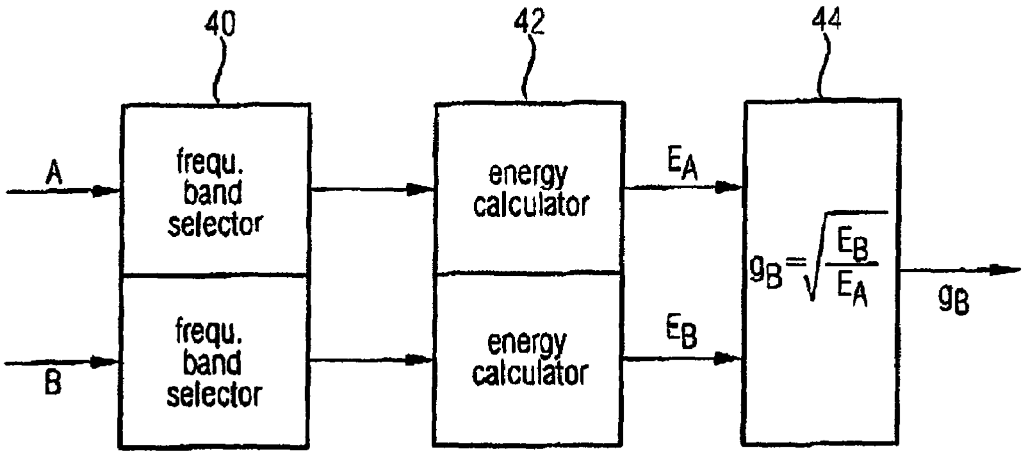
FIG 5 (decoder side)
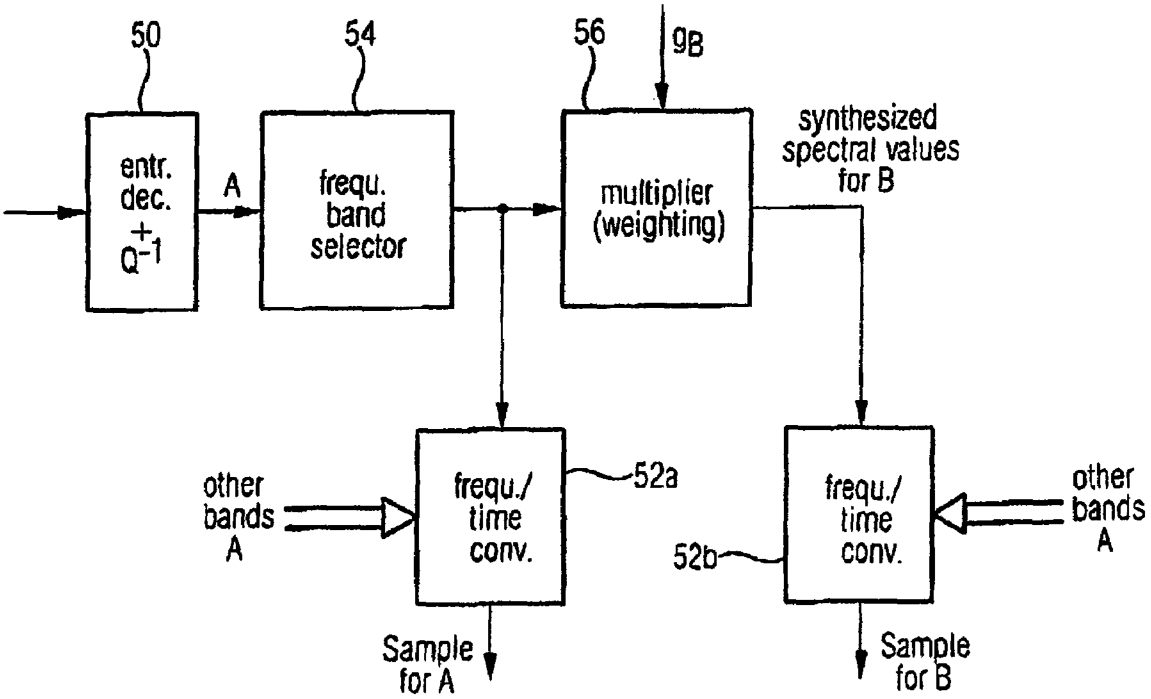

FIG 6

DOWNMIX $$L_C = t \cdot [L + a \cdot L_S + b \cdot C]$$

$$R_C = t \cdot [R + a \cdot R_S + b \cdot C]$$

all signals are time domain signals $a,b,t < 1$
preferred: $a=b=0{,}7$
or: $a=0{,}5$; $b=0{,}7$

FIG 7

| ch. side info | CHANNEL B<br>sideinfos/parameters for: | CHANNEL A<br>are determined using: |
|---|---|---|
| $l_i$ | $L$ | $L_C$ |
| $l_{si}$ | $L_S$ | $L_C$ |
| $r_i$ | $R$ | $R_C$ |
| $r_{si}$ | $R_S$ | $R_C$ |
| $C_i$ | $C$ | $L_C+R_C$ |

COMPATIBLE MULTI-CHANNEL CODING/DECODING

CROSS-REFERENCE TO RELATED APPLICATION

This application is a continuation of application Ser. No. 10/679,085, filed Oct. 2, 2003, the contents of which is incorporated herewith in its entirety.

BACKGROUND OF THE INVENTION

Field of the Invention

The present invention relates to an apparatus and a method for processing a multi-channel audio signal and, in particular, to an apparatus and a method for processing a multi-channel audio signal in a stereo-compatible manner.

In recent times, the multi-channel audio reproduction technique is becoming more and more important. This may be due to the fact that audio compression/encoding techniques such as the well-known mp3 technique have made it possible to distribute audio records via the Internet or other transmission channels having a limited bandwidth. The mp3 coding technique has become so famous because of the fact that it allows distribution of all the records in a stereo format, i.e., a digital representation of the audio record including a first or left stereo channel and a second or right stereo channel.

Nevertheless, there are basic shortcomings of conventional two-channel sound systems. Therefore, the surround technique has been developed. A recommended multi-channel-surround representation includes, in addition to the two stereo channels L and R, an additional center channel C and two surround channels Ls, Rs. This reference sound format is also referred to as three/two-stereo, which means three front channels and two surround channels. Generally, five transmission channels are required. In a playback environment, at least five speakers at the respective five different places are needed to get an optimum sweet spot in a certain distance from the five well-placed loudspeakers.

Several techniques are known in the art for reducing the amount of data required for transmission of a multi-channel audio signal. Such techniques are called joint stereo techniques. To this end, reference is made to FIG. 10, which shows a joint stereo device 60. This device can be a device implementing e.g. intensity stereo (IS) or binaural cue coding (BCC). Such a device generally receives—as an input—at least two channels (CH1, CH2, . . . CHn), and outputs a single carrier channel and parametric data. The parametric data are defined such that, in a decoder, an approximation of an original channel (CH1, CH2, . . . CHn) can be calculated.

Normally, the carrier channel will include subband samples, spectral coefficients, time domain samples etc, which provide a comparatively fine representation of the underlying signal, while the parametric data do not include such samples of spectral coefficients but include control parameters for controlling a certain reconstruction algorithm such as weighting by multiplication, time shifting, frequency shifting . . . . The parametric data, therefore, include only a comparatively coarse representation of the signal or the associated channel. Stated in numbers, the amount of data required by a carrier channel will be in the range of 60-70 kbit/s, while the amount of data required by parametric side information for one channel will be in the range of 1.5-2.5 kbit/s. An example for parametric data are the well-known scale factors, intensity stereo information or binaural cue parameters as will be described below.

Intensity stereo coding is described in AES preprint 3799, "Intensity Stereo Coding", J. Herre, K. H. Brandenburg, D. Lederer, February 1994, Amsterdam. Generally, the concept of intensity stereo is based on a main axis transform to be applied to the data of both stereophonic audio channels. If most of the data points are concentrated around the first principle axis, a coding gain can be achieved by rotating both signals by a certain angle prior to coding. This is, however, not always true for real stereophonic production techniques. Therefore, this technique is modified by excluding the second orthogonal component from transmission in the bit stream. Thus, the reconstructed signals for the left and right channels consist of differently weighted or scaled versions of the same transmitted signal. Nevertheless, the reconstructed signals differ in their amplitude but are identical regarding their phase information. The energy-time envelopes of both original audio channels, however, are preserved by means of the selective scaling operation, which typically operates in a frequency selective manner. This conforms to the human perception of sound at high frequencies, where the dominant spatial cues are determined by the energy envelopes.

Additionally, in practically implementations, the transmitted signal, i.e. the carrier channel is generated from the sum signal of the left channel and the right channel instead of rotating both components. Furthermore, this processing, i.e., generating intensity stereo parameters for performing the scaling operation, is performed frequency selective, i.e., independently for each scale factor band, i.e., encoder frequency partition. Preferably, both channels are combined to form a combined or "carrier" channel, and, in addition to the combined channel, the intensity stereo information is determined which depend on the energy of the first channel, the energy of the second channel or the energy of the combined or channel.

The BCC technique is described in AES convention paper 5574, "Binaural cue coding applied to stereo and multi-channel audio compression", C. Faller, F. Baumgarte, May 2002, Munich. In BCC encoding, a number of audio input channels are converted to a spectral representation using a DFT based transform with overlapping windows. The resulting uniform spectrum is divided into non-overlapping partitions each having an index. Each partition has a bandwidth proportional to the equivalent rectangular bandwidth (ERB). The inter-channel level differences (ICLD) and the inter-channel time differences (ICTD) are estimated for each partition for each frame k. The ICLD and ICTD are quantized and coded resulting in a BCC bit stream. The inter-channel level differences and inter-channel time differences are given for each channel relative to a reference channel. Then, the parameters are calculated in accordance with prescribed formulae, which depend on the certain partitions of the signal to be processed.

At a decoder-side, the decoder receives a mono signal and the BCC bit stream. The mono signal is transformed into the frequency domain and input into a spatial synthesis block, which also receives decoded ICLD and ICTD values. In the spatial synthesis block, the BCC parameters (ICLD and ICTD) values are used to perform a weighting operation of the mono signal in order to synthesize the multi-channel signals, which, after a frequency/time conversion, represent a reconstruction of the original multi-channel audio signal.

In case of BCC, the joint stereo module 60 is operative to output the channel side information such that the parametric channel data are quantized and encoded ICLD or ICTD parameters, wherein one of the original channels is used as the reference channel for coding the channel side information.

Normally, the carrier channel is formed of the sum of the participating original channels.

Naturally, the above techniques only provide a mono representation for a decoder, which can only process the carrier channel, but is not able to process the parametric data for generating one or more approximations of more than one input channel.

To transmit the five channels in a compatible way, i.e., in a bitstream format, which is also understandable for a normal stereo decoder, the so-called matrixing technique has been used as described in "MUSICAM surround: a universal multi-channel coding system compatible with ISO 11172-3", G. Theile and G. Stoll, AES preprint 3403, October 1992, San Francisco. The five input channels L, R, C, Ls, and Rs are fed into a matrixing device performing a matrixing operation to calculate the basic or compatible stereo channels Lo, Ro, from the five input channels. In particular, these basic stereo channels Lo/Ro are calculated as set out below:

$$Lo=L+xC+yLs$$

$$Ro=R+xC+yRs$$

x and y are constants. The other three channels C, Ls, Rs are transmitted as they are in an extension layer, in addition to a basic stereo layer, which includes an encoded version of the basic stereo signals Lo/Ro. With respect to the bitstream, this Lo/Ro basic stereo layer includes a header, information such as scale factors and subband samples. The multi-channel extension layer, i.e., the central channel and the two surround channels are included in the multi-channel extension field, which is also called ancillary data field.

At a decoder-side, an inverse matrixing operation is performed in order to form reconstructions of the left and right channels in the five-channel representation using the basic stereo channels Lo, Ro and the three additional channels. Additionally, the three additional channels are decoded from the ancillary information in order to obtain a decoded five-channel or surround representation of the original multi-channel audio signal.

Another approach for multi-channel encoding is described in the publication "Improved MPEG-2 audio multi-channel encoding", B. Grill, J. Herre, K. H. Brandenburg, E. Eberlein, J. Koller, J. Mueller, AES preprint 3865, February 1994, Amsterdam, in which, in order to obtain backward compatibility, backward compatible modes are considered. To this end, a compatibility matrix is used to obtain two so-called downmix channels Lc, Rc from the original five input channels. Furthermore, it is possible to dynamically select the three auxiliary channels transmitted as ancillary data.

In order to exploit stereo irrelevancy, a joint stereo technique is applied to groups of channels, e.g. the three front channels, i.e., for the left channel, the right channel and the center channel. To this end, these three channels are combined to obtain a combined channel. This combined channel is quantized and packed into the bitstream. Then, this combined channel together with the corresponding joint stereo information is input into a joint stereo decoding module to obtain joint stereo decoded channels, i.e., a joint stereo decoded left channel, a joint stereo decoded right channel and a joint stereo decoded center channel. These joint stereo decoded channels are, together with the left surround channel and the right surround channel input into a compatibility matrix block to form the first and the second downmix channels Lc, Rc. Then, quantized versions of both downmix channels and a quantized version of the combined channel are packed into the bitstream together with joint stereo coding parameters.

Using intensity stereo coding, therefore, a group of independent original channel signals is transmitted within a single portion of "carrier" data. The decoder then reconstructs the involved signals as identical data, which are rescaled according to their original energy-time envelopes. Consequently, a linear combination of the transmitted channels will lead to results, which are quite different from the original downmix. This applies to any kind of joint stereo coding based on the intensity stereo concept. For a coding system providing compatible downmix channels, there is a direct consequence: The reconstruction by dematrixing, as described in the previous publication, suffers from artifacts caused by the imperfect reconstruction. Using a so-called joint stereo predistortion scheme, in which a joint stereo coding of the left, the right and the center channels is performed before matrixing in the encoder, alleviates this problem. In this way, the dematrixing scheme for reconstruction introduces fewer artifacts, since, on the encoder-side, the joint stereo decoded signals have been used for generating the downmix channels. Thus, the imperfect reconstruction process is shifted into the compatible downmix channels Lc and Rc, where it is much more likely to be masked by the audio signal itself.

Although such a system has resulted in fewer artifacts because of dematrixing on the decoder-side, it nevertheless has some drawbacks. A drawback is that the stereo-compatible downmix channels Lc and Rc are derived not from the original channels but from intensity stereo coded/decoded versions of the original channels. Therefore, data losses because of the intensity stereo coding system are included in the compatible downmix channels. A stereo-only decoder, which only decodes the compatible channels rather than the enhancement intensity stereo encoded channels, therefore, provides an output signal, which is affected by intensity stereo induced data losses.

Additionally, a full additional channel has to be transmitted besides the two downmix channels. This channel is the combined channel, which is formed by means of joint stereo coding of the left channel, the right channel and the center channel. Additionally, the intensity stereo information to reconstruct the original channels L, R, C from the combined channel also has to be transmitted to the decoder. At the decoder, an inverse matrixing, i.e., a dematrixing operation is performed to derive the surround channels from the two downmix channels. Additionally, the original left, right and center channels are approximated by joint stereo decoding using the transmitted combined channel and the transmitted joint stereo parameters. It is to be noted that the original left, right and center channels are derived by joint stereo decoding of the combined channel.

SUMMARY OF THE INVENTION

It is the object of the present invention to provide a concept for a bit-efficient and artifact-reduced processing or inverse processing of a multi-channel audio signal.

In accordance with a first aspect of the present invention, this object is achieved by an apparatus for processing a multi-channel audio signal, the multi-channel audio signal having at least three original channels, comprising: means for providing a first downmix channel and a second downmix channel, the first and the second downmix channels being derived from the original channels; means for calculating channel side information for a selected original channel of the original signals, the means for calculating being operative to calculate the channel side information such that a downmix channel or a combined downmix channel including the first and the second downmix channel, when weighted using the channel side information, results in an approximation of the selected original channel; and means for generating output data, the output data including the channel side information, the first downmix channel or a signal derived from the first downmix channel and the second downmix channel or a signal derived from the second downmix channel.

In accordance with a second aspect of the present invention, this object is achieved by a method of processing a multi-channel audio signal, the multi-channel audio signal having at least three original channels, comprising: providing a first downmix channel and a second downmix channel, the first and the second downmix channels being derived from the original channels; calculating channel side information for a selected original channel of the original signals such that a downmix channel or a combined downmix channel including the first and the second downmix channel, when weighted using the channel side information, results in an approximation of the selected original channel; and generating output data, the output data including the channel side information, the first downmix channel or a signal derived from the first downmix channel and the second downmix channel or a signal derived from the second downmix channel.

In accordance with a third aspect of the present invention, this object is achieved by an apparatus for inverse processing of input data, the input data including channel side information, a first downmix channel or a signal derived from the first downmix channel and a second downmix channel or a signal derived from the second downmix channel, wherein the first downmix channel and the second downmix channel are derived from at least three original channels of a multi-channel audio signal, and wherein the channel side information are calculated such that a downmix channel or a combined downmix channel including the first downmix channel and the second downmix channel, when weighted using the channel side information, results in an approximation of the selected original channel, the apparatus comprising: an input data reader for reading the input data to obtain the first downmix channel or a signal derived from the first downmix channel and the second downmix channel or a signal derived from the second downmix channel and the channel side information; and a channel reconstructor for reconstructing the approximation of the selected original channel using the channel side information and the downmix channel or the combined downmix channel to obtain the approximation of the selected original channel.

In accordance with a fourth aspect of the present invention, this object is achieved by a method of inverse processing of input data, the input data including channel side information, a first downmix channel or a signal derived from the first downmix channel and a second downmix channel or a signal derived from the second downmix channel, wherein the first downmix channel and the second downmix channel are derived from at least three original channels of a multi-channel audio signal, and wherein the channel side information are calculated such that a downmix channel or a combined downmix channel including the first downmix channel and the second downmix channel, when weighted using the channel side information, results in an approximation of the selected original channel, the method comprising: reading the input data to obtain the first downmix channel or a signal derived from the first downmix channel and the second downmix channel or a signal derived from the second downmix channel and the channel side information; and reconstructing the approximation of the selected original channel using the channel side information and the downmix channel or the combined downmix channel to obtain the approximation of the selected original channel.

In accordance with a fifth aspect and a sixth aspect of the present invention, this object is achieved by a computer program including the method of processing or the method of inverse processing.

The present invention is based on the finding that an efficient and artifact-reduced encoding of multi-channel audio signal is obtained, when two downmix channels preferably representing the left and right stereo channels, are packed into output data.

Inventively, parametric channel side information for one or more of the original channels are derived such that they relate to one of the downmix channels rather than, as in the prior art, to an additional "combined" joint stereo channel. This means that the parametric channel side information are calculated such that, on a decoder side, a channel reconstructor uses the channel side information and one of the downmix channels or a combination of the downmix channels to reconstruct an approximation of the original audio channel, to which the channel side information is assigned.

The inventive concept is advantageous in that it provides a bit-efficient multi-channel extension such that a multi-channel audio signal can be played at a decoder.

Additionally, the inventive concept is backward compatible, since a lower scale decoder, which is only adapted for two-channel processing, can simply ignore the extension information, i.e., the channel side information. The lower scale decoder can only play the two downmix channels to obtain a stereo representation of the original multi-channel audio signal. A higher scale decoder, however, which is enabled for multi-channel operation, can use the transmitted channel side information to reconstruct approximations of the original channels.

The present invention is advantageous in that it is bit-efficient, since, in contrast to the prior art, no additional carrier channel beyond the first and second downmix channels Lc, Rc is required. Instead, the channel side information are related to one or both downmix channels. This means that the downmix channels themselves serve as a carrier channel, to which the channel side information are combined to reconstruct an original audio channel. This means that the channel side information are preferably parametric side information, i.e., information which do not include any subband samples or spectral coefficients. Instead, the parametric side information are information used for weighting (in time and/or frequency) the respective downmix channel or the combination of the respective downmix channels to obtain a reconstructed version of a selected original channel.

In a preferred embodiment of the present invention, a backward compatible coding of a multi-channel signal based on a compatible stereo signal is obtained. Preferably, the compatible stereo signal (downmix signal) is generated using matrixing of the original channels of multi-channel audio signal.

Inventively, channel side information for a selected original channel is obtained based on joint stereo techniques such as intensity stereo coding or binaural cue coding. Thus, at the decoder side, no dematrixing operation has to be performed. The problems associated with dematrixing, i.e., certain artifacts related to an undesired distribution of quantization noise in dematrixing operations, are avoided. This is due to the fact that the decoder uses a channel reconstructor, which reconstructs an original signal, by using one of the downmix channels or a combination of the downmix channels and the transmitted channel side information.

Preferably, the inventive concept is applied to a multi-channel audio signal having five channels. These five channels are a left channel L, a right channel R, a center channel C, a left surround channel Ls, and a right surround channel Rs.

Preferably, downmix channels are stereo compatible downmix channels Ls and Rs, which provide a stereo representation of the original multi-channel audio signal.

In accordance with the preferred embodiment of the present invention, for each original channel, channel side information are calculated at an encoder side packed into output data. Channel side information for the original left channel are derived using the left downmix channel. Channel side information for the original left surround channel are derived using the left downmix channel. Channel side information for the original right channel are derived from the right downmix channel. Channel side information for the original right surround channel are derived from the right downmix channel.

In accordance with the preferred embodiment of the present invention, channel information for the original center channel are derived using the first downmix channel as well as the second downmix channel, i.e., using a combination of the two downmix channels. Preferably, this combination is a summation.

Thus, the groupings, i.e., the relation between the channel side information and the carrier signal, i.e., the used downmix channel for providing channel side information for a selected original channel are such that, for optimum quality, a certain downmix channel is selected, which contains the highest possible relative amount of the respective original multi-channel signal which is represented by means of channel side information. As such a joint stereo carrier signal, the first and the second downmix channels are used. Preferably, also the sum of the first and the second downmix channels can be used. Naturally, the sum of the first and second downmix channels can be used for calculating channel side information for each of the original channels. Preferably, however, the sum of the downmix channels is used for calculating the channel side information of the original center channel in a surround environment, such as five channel surround, seven channel surround, 5.1 surround or 7.1 surround. Using the sum of the first and second downmix channels is especially advantageous, since no additional transmission overhead has to be performed. This is due to the fact that both downmix channels are present at the decoder such that summing of these downmix channels can easily be performed at the decoder without requiring any additional transmission bits.

Preferably, the channel side information forming the multi-channel extension is input into the output data bit stream in a compatible way such that a lower scale decoder simply ignores the multi-channel extension data and only provides a stereo representation of the multi-channel audio signal. Nevertheless, a higher scale encoder not only uses two downmix channels, but, in addition, employs the channel side information to reconstruct a full multi-channel representation of the original audio signal.

An inventive decoder is operative to firstly decode both downmix channels and to read the channel side information for the selected original channels. Then, the channel side information and the downmix channels are used to reconstruct approximations of the original channels. To this end, preferably no dematrixing operation at all is performed. This means that, in this embodiment, each of the e.g. five original input channels are reconstructed using e.g. five sets of different channel side information. In the decoder, the same grouping as in the encoder is performed for calculating the reconstructed channel approximation. In a five-channel surround environment, this means that, for reconstructing the original left channel, the left downmix channel and the channel side information for the left channel are used. To reconstruct the original right channel, the right downmix channel and the channel side information for the right channel are used. To reconstruct the original left surround channel, the left downmix channel and the channel side information for the left surround channel are used. To reconstruct the original right surround channel, the channel side information for the right surround channel and the right downmix channel are used. To reconstruct the original center channel, a combined channel formed from the first downmix channel and the second downmix channel and the center channel side information are used.

Naturally, it is also possible to replay the first and second downmix channels as the left and right channels such that only three sets (out of e.g. five) of channel side information parameters have to be transmitted. This is, however, only advisable in situations, where there are less stringent rules with respect to quality. This is due to the fact that, normally, the left downmix channel and the right downmix channel are different from the original left channel or the original right channel. Only in situations, where one can not afford to transmit channel side information for each of the original channels, such processing is advantageous.

Other features which are considered as characteristic for the invention are set forth in the appended claims.

Although the invention is illustrated and described herein as embodied in compatible multi-channel coding/decoding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a block diagram of a preferred embodiment of the inventive encoder;

FIG. 2 is a block diagram of a preferred embodiment of the inventive decoder;

FIG. 4 illustrates another preferred embodiment of the means for calculating channel side information, in which the channel side information are gain factors;

FIG. 5 illustrates a preferred embodiment of an implementation of the decoder, when the encoder is implemented as in FIG. 4;

FIG. 6 illustrates a preferred implementation of the means for providing the downmix channels;

FIG. 7 illustrates groupings of original and downmix channels for calculating the channel side information for the respective original channels;

DETAILED DESCRIPTION OF THE INVENTION

Figure 3A:
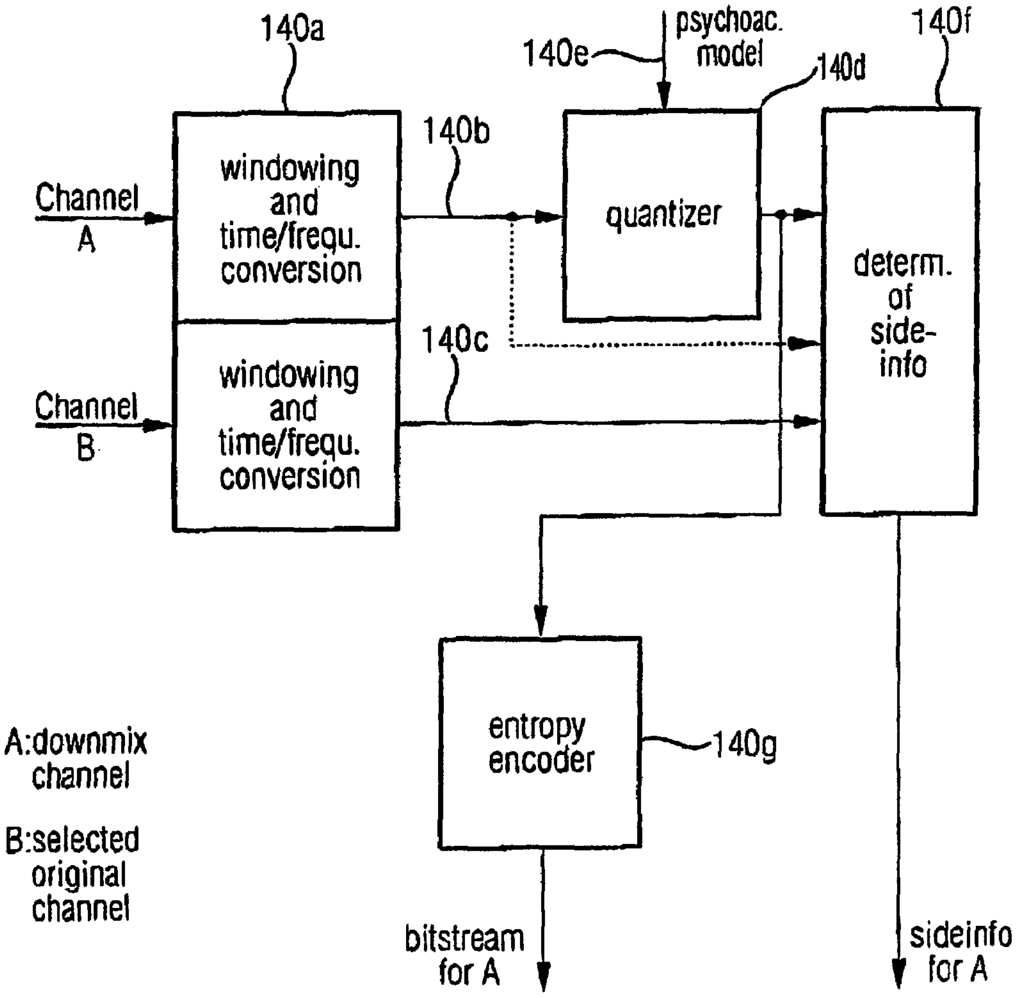
FIG. 3A is a block diagram for a preferred implementation of the means for calculating to obtain frequency selective channel side information.

FIG. 1 shows an apparatus for processing a multi-channel audio signal 10 having at least three original channels such as R, L and C. Preferably, the original audio signal has more than three channels, such as five channels in the surround environment, which is illustrated in FIG. 1. The five channels are the left channel L, the right channel R, the center channel C, the left surround channel Ls and the right surround channel Rs. The inventive apparatus includes means 12 for providing a first downmix channel Lc and a second downmix channel Rc, the first and the second downmix channels being derived from the original channels. For deriving the downmix channels from the original channels, there exist several possibilities. One possibility is to derive the downmix channels Lc and Rc by means of matrixing the original channels using a matrixing operation as illustrated in FIG. 6. This matrixing operation is performed in the time domain.

The matrixing parameters a, b and t are selected such that they are lower than or equal to 1. Preferably, a and b are 0.7 or 0.5. The overall weighting parameter t is preferably chosen such that channel clipping is avoided.

Alternatively, as it is indicated in FIG. 1, the downmix channels Lc and Rc can also be externally supplied. This may be done, when the downmix channels Lc and Rc are the result of a "hand mixing" operation. In this scenario, a sound engineer mixes the downmix channels by himself rather than by using an automated matrixing operation. The sound engineer performs creative mixing to get optimized downmix channels Lc and Rc which give the best possible stereo representation of the original multi-channel audio signal.

In case of an external supply of the downmix channels, the means for providing does not perform a matrixing operation but simply forwards the externally supplied downmix channels to a subsequent calculating means 14.

The calculating means 14 is operative to calculate the channel side information such as $l_i$, $ls_i$, $r_i$ or $rs_i$ for selected original channels such as L, Ls, R or Rs, respectively. In particular, the means 14 for calculating is operative to calculate the channel side information such that a downmix channel, when weighted using the channel side information, results in an approximation of the selected original channel.

Alternatively or additionally, the means for calculating channel side information is further operative to calculate the channel side information for a selected original channel such that a combined downmix channel including a combination of the first and second downmix channels, when weighted using the calculated channel side information results in an approximation of the selected original channel. To show this feature in the figure, an adder 14*a* and a combined channel side information calculator 14*b* are shown.

It is clear for those skilled in the art that these elements do not have to be implemented as distinct elements. Instead, the whole functionality of the blocks 14, 14*a*, and 14*b* can be implemented by means of a certain processor which may be a general purpose processor or any other means for performing the required functionality.

Additionally, it is to be noted here that channel signals being subband samples or frequency domain values are indicated in capital letters. Channel side information are, in contrast to the channels themselves, indicated by small letters. The channel side information $c_i$ is, therefore, the channel side information for the original center channel C.

The channel side information as well as the downmix channels Lc and Rc or an encoded version Lc' and Rc' as produced by an audio encoder 16 are input into an output data formatter 18. Generally, the output data formatter 18 acts as means for generating output data, the output data including the channel side information for at least one original channel, the first downmix channel or a signal derived from the first downmix channel (such as an encoded version thereof) and the second downmix channel or a signal derived from the second downmix channel (such as an encoded version thereof).

The output data or output bitstream 20 can then be transmitted to a bitstream decoder or can be stored or distributed. Preferably, the output bitstream 20 is a compatible bitstream which can also be read by a lower scale decoder not having a multi-channel extension capability. Such lower scale encoders such as most existing normal state of the art mp3 decoders will simply ignore the multi-channel extension data, i.e., the channel side information. They will only decode the first and second downmix channels to produce a stereo output. Higher scale decoders, such as multi-channel enabled decoders will read the channel side information and will then generate an approximation of the original audio channels such that a multi-channel audio impression is obtained.

Figure 8:
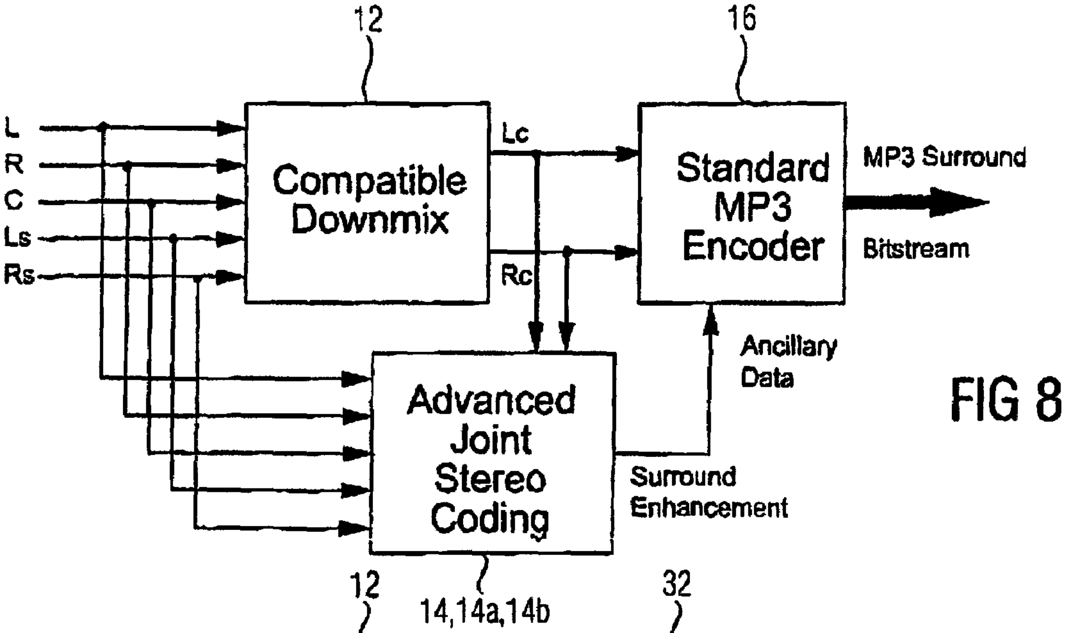
FIG. 8 illustrates another preferred embodiment of an inventive encoder.

FIG. 8 shows a preferred embodiment of the present invention in the environment of five channel surround/mp3. Here, it is preferred to write the surround enhancement data into the ancillary data field in the standardized mp3 bit stream syntax such that an "mp3 surround" bit stream is obtained.

FIG. 2 shows an illustration of an inventive decoder acting as an apparatus for inverse processing input data received at an input data port 22. The data received at the input data port 22 is the same data as output at the output data port 20 in FIG. 1. Alternatively, when the data are not transmitted via a wired channel but via a wireless channel, the data received at data input port 22 are data derived from the original data produced by the encoder.

The decoder input data are input into a data stream reader 24 for reading the input data to finally obtain the channel side information 26 and the left downmix channel 28 and the right downmix channel 30. In case the input data includes encoded versions of the downmix channels, which corresponds to the case, in which the audio encoder 16 in FIG. 1 is present, the data stream reader 24 also includes an audio decoder, which is adapted to the audio encoder used for encoding the downmix channels. In this case, the audio decoder, which is part of the data stream reader 24, is operative to generate the first downmix channel Lc and the second downmix channel Rc, or, stated more exactly, a decoded version of those channels. For ease of description, a distinction between signals and decoded versions thereof is only made where explicitly stated.

The channel side information 26 and the left and right downmix channels 28 and 30 output by the data stream reader 24 are fed into a multi-channel reconstructor 32 for providing a reconstructed version 34 of the original audio signals, which can be played by means of a multi-channel player 36. In case the multi-channel reconstructor is operative in the frequency domain, the multi-channel player 36 will receive frequency domain input data, which have to be in a certain way decoded such as converted into the time domain before playing them. To this end, the multi-channel player 36 may also include decoding facilities.

It is to be noted here that a lower scale decoder will only have the data stream reader 24, which only outputs the left and right downmix channels 28 and 30 to a stereo output 38. An enhanced inventive decoder will, however, extract the channel side information 26 and use these side information and the downmix channels 28 and 30 for reconstructing reconstructed versions 34 of the original channels using the multi-channel reconstructor 32.

FIG. 3A shows an embodiment of the inventive calculator 14 for calculating the channel side information, which an audio encoder on the one hand and the channel side information calculator on the other hand operate on the same spectral representation of multi-channel signal. FIG. 1, however, shows the other alternative, in which the audio encoder on the one hand and the channel side information calculator on the other hand operate on different spectral representations of the multi-channel signal. When computing resources are not as important as audio quality, the FIG. 1 alternative is preferred, since filterbanks individually optimized for audio encoding and side information calculation can be used. When, however, computing resources are an issue, the FIG. 3A alternative is preferred, since this alternative requires less computing power because of a shared utilization of elements.

The device shown in FIG. 3A is operative for receiving two channels A, B. The device shown in FIG. 3A is operative to calculate a side information for channel B such that using this channel side information for the selected original channel B, a reconstructed version of channel B can be calculated from the channel signal A. Additionally, the device shown in FIG. 3A is operative to form frequency domain channel side information, such as parameters for weighting (by multiplying or time processing as in BCC coding e.g.) spectral values or subband samples. To this end, the inventive calculator includes windowing and time/frequency conversion means 140*a* to obtain a frequency representation of channel A at an output 140*b* or a frequency domain representation of channel B at an output 140*c*.

In the preferred embodiment, the side information determination (by means of the side information determination means 140*f*) is performed using quantized spectral values. Then, a quantizer 140*d* is also present which preferably is controlled using a psychoacoustic model having a psychoacoustic model control input 140*e*. Nevertheless, a quantizer is not required, when the side information determination means 140*c* uses a non-quantized representation of the channel A for determining the channel side information for channel B.

In case the channel side information for channel B are calculated by means of a frequency domain representation of the channel A and the frequency domain representation of the channel B, the windowing and time/frequency conversion means 140*a* can be the same as used in a filterbank-based audio encoder. In this case, when AAC (ISO/IEC 13818-3) is considered, means 140*a* is implemented as an MDCT filter bank (MDCT=modified discrete cosine transform) with 50% overlap-and-add functionality.

In such a case, the quantizer 140*d* is an iterative quantizer such as used when mp3 or AAC encoded audio signals are generated. The frequency domain representation of channel A, which is preferably already quantized can then be directly used for entropy encoding using an entropy encoder 140*g*, which may be a Huffman based encoder or an entropy encoder implementing arithmetic encoding.

When compared to FIG. 1, the output of the device in FIG. 3A is the side information such as $I_i$ for one original channel (corresponding to the side information for B at the output of device 140*f*). The entropy encoded bitstream for channel A corresponds to e.g. the encoded left downmix channel Lc' at the output of block 16 in FIG. 1. From FIG. 3A it becomes clear that element 14 (FIG. 1), i.e., the calculator for calculating the channel side information and the audio encoder 16 (FIG. 1) can be implemented as separate means or can be implemented as a shared version such that both devices share several elements such as the MDCT filter bank 140*a*, the quantizer 140*e* and the entropy encoder 140*g*. Naturally, in case one needs a different transform etc. for determining the channel side information, then the encoder 16 and the calculator 14 (FIG. 1) will be implemented in different devices such that both elements do not share the filter bank etc.

Figure 3B:
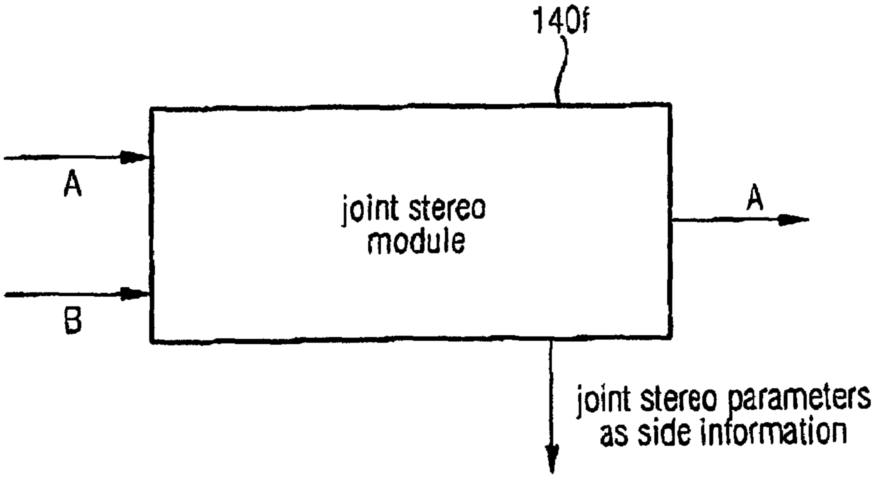
FIG. 3B is a preferred embodiment of a calculator implementing joint stereo processing such as intensity coding or binaural cue coding.

Generally, the actual determinator for calculating the side information (or generally stated the calculator 14) may be implemented as a joint stereo module as shown in FIG. 3B, which operates in accordance with any of the joint stereo techniques such as intensity stereo coding or binaural cue coding.

In contrast to such prior art intensity stereo encoders, the inventive determination means 140*f* does not have to calculate the combined channel. The "combined channel" or carrier channel, as one can say, already exists and is the left compatible downmix channel Lc or the right compatible downmix channel Rc or a combined version of these downmix channels such as Lc+Rc. Therefore, the inventive device 140*f* only has to calculate the scaling information for scaling the respective downmix channel such that the energy/time envelope of the respective selected original channel is obtained, when the downmix channel is weighted using the scaling information or, as one can say, the intensity directional information.

Therefore, the joint stereo module 140*f* in FIG. 3B is illustrated such that it receives, as an input, the "combined" channel A, which is the first or second downmix channel or a combination of the downmix channels, and the original selected channel. This module, naturally, outputs the "combined" channel A and the joint stereo parameters as channel side information such that, using the combined channel A and the joint stereo parameters, an approximation of the original selected channel B can be calculated.

Alternatively, the joint stereo module 140*f* can be implemented for performing binaural cue coding.

In the case of BCC, the joint stereo module 140*f* is operative to output the channel side information such that the channel side information are quantized and encoded ICLD or ICTD parameters, wherein the selected original channel serves as the actual to be processed channel, while the respective downmix channel used for calculating the side information, such as the first, the second or a combination of the first and second downmix channels is used as the reference channel in the sense of the BCC coding/decoding technique.

Referring to FIG. 4, a simple energy-directed implementation of element 140*f* is given. This device includes a frequency band selector 44 selecting a frequency band from channel A and a corresponding frequency band of channel B. Then, in both frequency bands, an energy is calculated by means of an energy calculator 42 for each branch. The detailed implementation of the energy calculator 42 will depend on whether the output signal from block 40 is a subband signal or are frequency coefficients. In other implementations, where scale factors for scale factor bands are calculated, one can already use scale factors of the first and second channel A, B as energy values $E_A$ and $E_B$ or at least as estimates of the energy. In a gain factor calculating device 44, a gain factor $g_B$ for the selected frequency band is determined based on a certain rule such as the gain determining rule illustrated in block 44 in FIG. 4. Here, the gain factor $g_B$ can directly be used for weighting time domain samples or frequency coefficients such as will be described later in FIG. 5. To this end, the gain factor $g_B$, which is valid for the selected frequency band is used as the channel side information for channel B as the selected original channel. This selected original channel B will not be transmitted to decoder but will be represented by the parametric channel side information as calculated by the calculator 14 in FIG. 1.

It is to be noted here that it is not necessary to transmit gain values as channel side information. It is also sufficient to transmit frequency dependent values related to the absolute energy of the selected original channel. Then, the decoder has to calculate the actual energy of the downmix channel and the gain factor based on the downmix channel energy and the transmitted energy for channel B.

FIG. 5 shows a possible implementation of a decoder set up in connection with a transform-based perceptual audio encoder. Compared to FIG. 2, the functionalities of the entropy decoder and inverse quantizer 50 (FIG. 5) will be included in block 24 of FIG. 2. The functionality of the frequency/time converting elements 52*a*, 52*b* (FIG. 5) will, however, be implemented in item 36 of FIG. 2. Element 50 in FIG. 5 receives an encoded version of the first or the second downmix signal Lc' or Rc'. At the output of element 50, an at least partly decoded version of the first and the second downmix channel is present which is subsequently called channel A. Channel A is input into a frequency band selector 54 for selecting a certain frequency band from channel A. This selected frequency band is weighted using a multiplier 56. The multiplier 56 receives, for multiplying, a certain gain factor $g_B$, which is assigned to the selected frequency band selected by the frequency band selector 54, which corresponds to the frequency band selector 40 in FIG. 4 at the encoder side. At the input of the frequency time converter 52*a*, there exists, together with other bands, a frequency domain representation of channel A. At the output of multiplier 56 and, in particular, at the input of frequency/time conversion means 52*b* there will be a reconstructed frequency domain representation of channel B. Therefore, at the output of element 52*a*, there will be a time domain representation for channel A, while, at the output of element 52*b*, there will be a time domain representation of reconstructed channel B.

It is to be noted here that, depending on the certain implementation, the decoded downmix channel Lc or Rc is not played back in a multi-channel enhanced decoder. In such a multi-channel enhanced decoder, the decoded downmix channels are only used for reconstructing the original channels. The decoded downmix channels are only replayed in lower scale stereo-only decoders.

Figure 9:
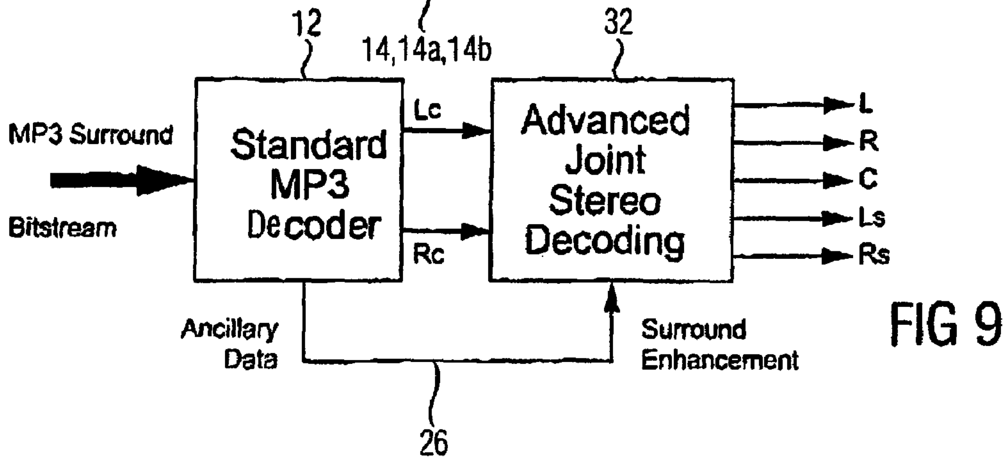
FIG. 9 illustrates another implementation of an inventive decoder.
Figure 10:
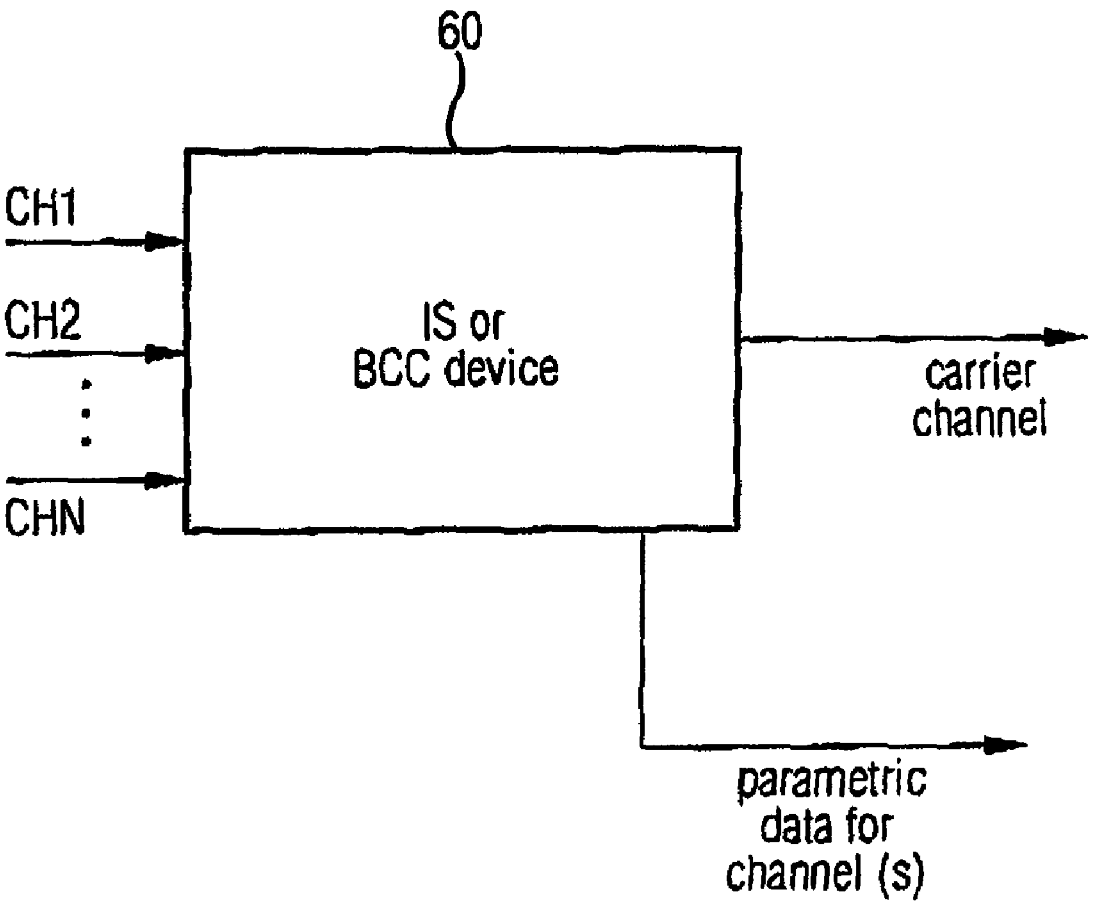
FIG 10 (Prior Art)
FIG. 10 illustrates a prior art joint stereo encoder.

To this end, reference is made to FIG. 9, which shows the preferred implementation of the present invention in a surround/mp3 environment. An mp3 enhanced surround bitstream is input into a standard mp3 decoder 24, which outputs decoded versions of the original downmix channels. These downmix channels can then be directly replayed by means of a low level decoder. Alternatively, these two channels are input into the advanced joint stereo decoding device 32 which also receives the multi-channel extension data, which are preferably input into the ancillary data field in a mp3 compliant bitstream.

Subsequently, reference is made to FIG. 7 showing the grouping of the selected original channel and the respective downmix channel or combined downmix channel. In this regard, the right column of the table in FIG. 7 corresponds to channel A in FIGS. 3A, 3B, 4 and 5, while the column in the middle corresponds to channel B in these figures. In the left column in FIG. 7, the respective channel side information is explicitly stated. In accordance with the FIG. 7 table, the channel side information $I_i$ for the original left channel L is calculated using the left downmix channel Lc. The left surround channel side information $Is_i$ is determined by means of the original selected left surround channel Ls and the left downmix channel Lc is the carrier. The right channel side information $r_i$ for the original right channel R are determined using the right downmix channel Rc. Additionally, the channel side information for the right surround channel Rs are determined using the right downmix channel Rc as the carrier. Finally, the channel side information $c_i$ for the center channel C are determined using the combined downmix channel, which is obtained by means of a combination of the first and the second downmix channel, which can be easily calculated in both an encoder and a decoder and which does not require any extra bits for transmission.

Naturally, one could also calculate the channel side information for the left channel e. g. based on a combined downmix channel or even a downmix channel, which is obtained by a weighted addition of the first and second downmix channels such as 0.7 Lc and 0.3 Rc, as long as the weighting parameters are known to a decoder or transmitted accordingly. For most applications, however, it will be preferred to only derive channel side information for the center channel from the combined downmix channel, i.e., from a combination of the first and second downmix channels.

To show the bit saving potential of the present invention, the following typical example is given. In case of a five channel audio signal, a normal encoder needs a bit rate of 64 kbit/s for each channel amounting to an overall bit rate of 320 kbit/s for the five channel signal. The left and right stereo signals require a bit rate of 128 kbit/s. Channels side information for one channel are between 1.5 and 2 kbit/s. Thus, even in a case, in which channel side information for each of the five channels are transmitted, this additional data add up to only 7.5 to 10 kbit/s. Thus, the inventive concept allows transmission of a five channel audio signal using a bit rate of 138 kbit/s (compared to 320 (!) kbit/s) with good quality, since the decoder does not use the problematic dematrixing operation. Probably even more important is the fact that the inventive concept is fully backward compatible, since each of the existing mp3 players is able to replay the first downmix channel and the second downmix channel to produce a conventional stereo output.

Depending on the application environment, the inventive method for processing or inverse processing can be implemented in hardware or in software. The implementation can be a digital storage medium such as a disk or a CD having electronically readable control signals, which can cooperate with a programmable computer system such that the inventive method for processing or inverse processing is carried out. Generally stated, the invention therefore, also relates to a computer program product having a program code stored on a machine-readable carrier, the program code being adapted for performing the inventive method, when the computer program product runs on a computer. In other words, the invention, therefore, also relates to a computer program having a program code for performing the method, when the computer program runs on a computer.

The invention claimed is:

1. Apparatus for processing a multi-channel audio signal, the multi-channel audio signal having at least three original channels, comprising:

a provider for providing a first downmix channel and a second downmix channel, the first and the second downmix channels being derived from the original channels;

a calculator for calculating channel side information for a selected original channel of the original signals, the calculator being operative to calculate the channel side information such that a downmix channel or a combined downmix channel comprising the first and the second downmix channel, when weighted using the channel side information, results in an approximation of the selected original channel;

a generator for generating output data, the output data comprising the channel side information;

wherein at least one of the provider, the calculator or the generator comprises a hardware implementation;

wherein the multi-channel audio signal includes a left channel, a left surround channel, a right channel and a right surround channel, wherein the provider is operative to provide the first downmix channel as a left downmix channel and to provide the second downmix channel as a right downmix channel, the left and the right downmix channels being formed such that a result, when played, is a stereo representation of the multi-channel audio signal, and wherein the calculator is operative:

to calculate the channel side information for the left channel as the selected original channel using the left downmix channel, to calculate the channel side information for the right channel as the selected original channel using the right downmix channel, to calculate the channel side information for the left surround channel as the selected original channel using the left downmix channel, and to calculate the channel side information for the right surround channel as the selected original channel using the right downmix channel.

2. Apparatus in accordance with claim 1, in which the generator is operative to generate the output data such that the output data additionally include the first downmix channel or a signal derived from the first downmix channel and the second downmix channel or a signal derived from the second downmix channel.

3. Apparatus in accordance with claim 1, in which the calculator is operative to determine the channel side information as parametric data not comprising time domain samples or spectral values.

4. Apparatus in accordance with claim 3, in which the calculator is operative to perform intensity stereo coding or binaural cue coding, such that the channel side information represent an energy distribution or binaural cue parameters for the selected original channel, wherein a downmix channel or a combined downmix channel is usable as a carrier channel.

5. Apparatus in accordance with claim 1, in which the provider is operative to derive the first downmix channel and the second downmix channel from the original channels using a first predetermined linear weighted combination for the first downmix channel and using a second predetermined linear weighted combination for the second downmix channel.

6. Apparatus in accordance with claim 5, in which the first predetermined linear weighted combination is defined as follows:

$$Lc=t\cdot(L+a\cdot Ls+b\cdot C);\ \text{or}$$

in which the predetermined second linear weighted combination is defined as follows:

$$Rc=t\cdot(R+a\cdot Rs+b\cdot C),$$

wherein Lc is the first downmix channel, wherein Rc is the second downmix channel, wherein t, a and b are weighting factors smaller than 1, wherein L is an original left channel, wherein C is an original center channel, wherein R is an original right channel, wherein Ls is an original left surround channel, and wherein Rs is an original right surround channel.

7. Apparatus in accordance with claim 1, in which the provider is operative to receive externally supplied first and second downmix channels.

8. Apparatus in accordance with claim 1, in which the first downmix channel and the second downmix channel are generated by combining the original channels in varying degrees, wherein the calculator is operative, to use, for calculating the channel side information, the downmix channel among both downmix channels, which is stronger influenced by the selected original channel when compared to the other downmix channel.

9. Apparatus in accordance with claim 1, in which the generator is operative to form the output data such that the output data are in compliance with an output data syntax to be used by a low level decoder for processing the first downmix channel or a signal derived from the first downmix channel or the second downmix channel or a signal derived from the second downmix channel to obtain a decoded stereo representation of the multi-channel audio signal.

10. Apparatus in accordance with claim 9, in which the output data syntax is structured such that the output data syntax includes a special data field to be ignored by a low level decoder, and in which the generator is operative to insert the channel side information into the special data field.

11. Apparatus in accordance with claim 10, in which the syntax is mp3 syntax and the special data field is an ancillary data field.

12. Apparatus in accordance with claim 9, in which the generator is operative to insert the channel side information into the output data such that the channel side information are only used by a high level decoder but are ignored by the low level decoder.

13. Apparatus in accordance with claim 2, which further comprises an encoder for encoding the first downmix channel to obtain the signal derived from the first downmix channel or for encoding the second downmix channel to obtain the signal derived from the second downmix channel.

14. Apparatus in accordance with claim 13, in which the encoder is a perceptual encoder which includes means for converting a signal to be encoded into a spectral representation, means for quantizing the spectral representation using a psychoacoustic model and means for entropy encoding a quantized spectral representation to obtain an entropy encoded quantized spectral representation as the signal derived from the first downmix channel or the signal derived from the second downmix channel.

15. Apparatus in accordance with claim 14, in which the perceptual encoder is an encoder in accordance with MPEG-1/2 layer III (mp3) or MPEG-2/4 advanced audio coding (AAC).

16. Apparatus in accordance with claim 1, in which the calculator is operative to calculate downmix energy values for the downmix channel or the combined downmix channel, to calculate an original energy value for the selected original channel, and to calculate a gain factor as the channel side information, the gain factor being derived from the downmix energy value and the original energy value.

17. Apparatus in accordance with claim 1, in which the calculator is operative to calculate frequency dependent channel side information parameters such that for a plurality of frequency bands, a plurality of different channel side information parameters are obtained.

18. Method of processing a multi-channel audio signal, the multi-channel audio signal having at least three original channels, comprising:

providing, by a provider, a first downmix channel and a second downmix channel, the first and the second downmix channels being derived from the original channels;

calculating, by a calculator, channel side information for a selected original channel of the original signals such that a downmix channel or a combined downmix channel comprising the first and the second downmix channel, when weighted using the channel side information, results in an approximation of the selected original channel;

generating, by a generator, output data, the output data comprising the channel side information;

wherein at least one of the provider, the calculator or the generator comprises a hardware implementation;

wherein the multi-channel audio signal includes a left channel, a left surround channel, a right channel and a right surround channel;

wherein the first downmix channel is provided as a left downmix channel and the second downmix channel is provided as a right downmix channel, the left and the right downmix channels being formed such that a result, when played, is a stereo representation of the multi-channel audio signal;

wherein the channel side information for the left channel as the selected original channel is calculated using the left downmix channel;

wherein the channel side information for the right channel as the selected original channel is calculated using the right downmix channel;

wherein the channel side information for the left surround channel as the selected original channel is calculated using the left downmix channel; and wherein the channel side information for the right surround channel as the selected original channel is calculated using the right downmix channel.

19. A non-transitory storage medium having stored thereon a computer program having a program code for performing a method of processing a multi-channel audio signal, the multi-channel audio signal having at least three original channels, comprising:

providing a first downmix channel and a second downmix channel, the first and the second downmix channels being derived from the original channels;

calculating channel side information for a selected original channel of the original signals such that a downmix channel or a combined downmix channel comprising the first and the second downmix channel, when weighted using the channel side information, results in an approximation of the selected original channel; and generating output data, the output data comprising the channel side information;

wherein the multi-channel audio signal includes a left channel, a left surround channel, a right channel and a right surround channel;

wherein the first downmix channel is provided as a left downmix channel and the second downmix channel is provided as a right downmix channel, the left and the right downmix channels being formed such that a result, when played, is a stereo representation of the multi-channel audio signal;

wherein the channel side information for the left channel as the selected original channel is calculated using the left downmix channel;

wherein the channel side information for the right channel as the selected original channel is calculated using the right downmix channel;

wherein the channel side information for the left surround channel as the selected original channel is calculated using the left downmix channel; and wherein the channel side information for the right surround channel as the selected original channel is calculated using the right downmix channel.

20. Apparatus for processing a multi-channel audio signal, the multi-channel audio signal having at least three original channels, comprising:

a provider for providing a first downmix channel and a second downmix channel, the first and the second downmix channels being derived from the original channels;

a calculator for calculating channel side information for a selected original channel of the original signals, the calculator being operative to calculate the channel side information such that a downmix channel or a combined downmix channel comprising the first and the second downmix channel, when weighted using the channel side information, results in an approximation of the selected original channel;

a generator for generating output data, the output data comprising the channel side information;

wherein at least one of the provider, the calculator or the generator comprises a hardware implementation;

wherein the original channels include a center channel;

wherein the apparatus further includes a combiner for combining the first downmix channel and the second downmix channel to obtain the combined downmix channel; and wherein the calculator for calculating the channel side information for the center channel as the selected original channel is operative to calculate the channel side information such that the combined downmix channel when weighted using the channel side information results in an approximation of the original center channel.

21. Method of processing a multi-channel audio signal, the multi-channel audio signal having at least three original channels, comprising:

providing, by a provider, a first downmix channel and a second downmix channel, the first and the second downmix channels being derived from the original channels;

calculating, by a calculator, channel side information for a selected original channel of the original signals such that a downmix channel or a combined downmix channel comprising the first and the second downmix channel, when weighted using the channel side information, results in an approximation of the selected original channel;

generating, by a generator, output data, the output data comprising the channel side information;

wherein the provider, the calculator or the generator comprises a hardware implementation;

wherein the original channels include a center channel;

wherein the method further comprises combining the first downmix channel and the second downmix channel to obtain the combined downmix channel; and wherein the channel side information for the center channel as the selected original channel is calculated such that the combined downmix channel when weighted using the channel side information results in an approximation of the original center channel.

22. Non-transitory storage medium having stored thereon a computer program having a program code for performing a method of processing a multi-channel audio signal, the multi-channel audio signal having at least three original channels, comprising:

providing a first downmix channel and a second downmix channel, the first and the second downmix channels being derived from the original channels;

calculating channel side information for a selected original channel of the original signals such that a downmix channel or a combined downmix channel comprising the first and the second downmix channel, when weighted using the channel side information, results in an approximation of the selected original channel;

generating output data, the output data comprising the channel side information, wherein the original channels include a center channel;

wherein the method further comprises combining the first downmix channel and the second downmix channel to obtain the combined downmix channel; and wherein the channel side information for the center channel as the selected original channel is calculated such that the combined downmix channel when weighted using the channel side information results in an approximation of the original center channel.

* * * * *